United States Patent [19]

Verduijn

[11] Patent Number: 5,672,331
[45] Date of Patent: Sep. 30, 1997

[54] PROCESS FOR PREPARING UNIFORM MFI-TYPE ZEOLITE CRYSTALS

[75] Inventor: Johannes Petrus Verduijn, Leefdaal, Belgium

[73] Assignee: Exxon Chemical Patents Inc. (ECPI), Linden, N.J.

[21] Appl. No.: 211,875

[22] PCT Filed: Oct. 8, 1992

[86] PCT No.: PCT/EP92/02330

§ 371 Date: Jun. 3, 1994

§ 102(e) Date: Jun. 3, 1994

[87] PCT Pub. No.: WO93/08124

PCT Pub. Date: Apr. 19, 1993

[30] Foreign Application Priority Data

Oct. 23, 1991 [GB] United Kingdom ............... 9122498

[51] Int. Cl.⁶ .................................................. C01B 39/40
[52] U.S. Cl. ...................... 423/702; 423/705; 423/709; 423/DIG. 22; 502/77
[58] Field of Search ...................... 423/709, DIG. 22, 423/702, 705; 502/77

[56] References Cited

U.S. PATENT DOCUMENTS

| | | | |
|---|---|---|---|
| 3,702,886 | 11/1972 | Argauer et al. | 423/705 |
| 3,781,225 | 12/1973 | Schwartz | 502/77 |
| 3,808,326 | 4/1974 | McDaniel et al. | 423/709 |
| 4,002,697 | 1/1977 | Chen | 585/454 |
| 4,061,724 | 12/1977 | Grose et al. | |
| 4,100,262 | 7/1978 | Pelrine | 502/77 |
| 4,166,099 | 8/1979 | McDaniel et al. | 423/709 |
| 4,205,053 | 5/1980 | Roumann | 423/703 |
| 4,371,628 | 2/1983 | Nanne et al. | 423/713 |
| 4,526,879 | 7/1985 | Dwyer et al. | 502/71 |
| 4,797,267 | 1/1989 | Kuehl | 502/77 |
| 4,908,342 | 3/1990 | McWilliams et al. | 502/68 |
| 5,013,537 | 5/1991 | Patarin et al. | 502/66 |
| 5,240,892 | 8/1993 | Klocke | 502/77 |
| 5,268,162 | 12/1993 | Ishida et al. | 423/704 |

FOREIGN PATENT DOCUMENTS

| | | |
|---|---|---|
| 0110650 | 6/1984 | European Pat. Off. ............ 423/709 |
| 0342075 | 11/1989 | European Pat. Off. . |
| 3028980 | 8/1991 | Germany . |

*Primary Examiner*—Mark L. Bell
*Assistant Examiner*—David Sample
*Attorney, Agent, or Firm*—Edward F. Sherer

[57] ABSTRACT

MFI zeolite crystals of uniform and controllable size may be produced by mixing:

(i) a source of particulate silica in which silica particles present have an average diameter of 1 μm or less;

(ii) seeds of an MFI zeolite having an average diameter of 100 nm or less in the form of a colloidal suspension;

(iii) an organic structure directing agent; and (iv) a source of fluorine or an alkali metal;

to form an aqueous synthesis mixture, the seeds being present in an amount of 0.05 to 1700 ppm by weight of the synthesis mixture, and the synthesis mixture having an alkalinity in terms of $OH^-/SiO_2$ molar ratio of less than 0.1, and allowing the synthesis mixture to crystallize.

13 Claims, 7 Drawing Sheets

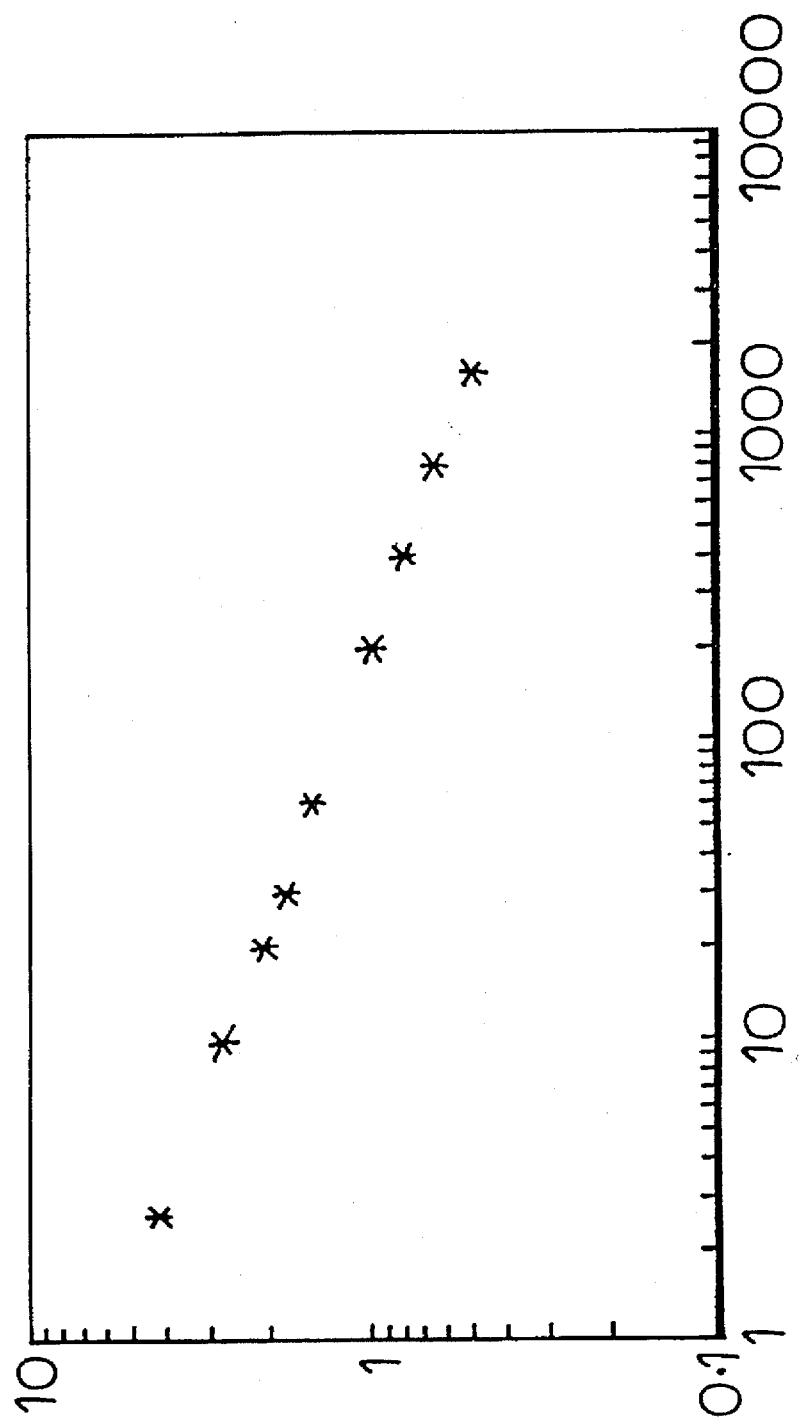

SYNTHESIS MIXTURE
NOT SEEDED

CRYSTALLITE SIZE 14 μm (x 2500 *)

SYNTHESIS MIXTURE
SEEDED WITH 2·7 wt ppm
SEEDS
(EXAMPLES)

CRYSTALLITE SIZE 4·2 μm (x 2500 *)

SYNTHESIS MIXTURE
SEEDED WITH 1600 wt ppm

CRYSTALLITE SIZE 0·5 μm (x 2500 *)

SYNTHESIS MIXTURE
NOT SEEDED

CRYSTAL LENGTH: 29 μm (x2500*)

SYNTHESIS MIXTURE
WITH 6-5 wtppm SEEDS:

CRYSTAL LENGTH: 3-7 μm (x2500*)

SYNTHESIS MIXTURE
SEEDED WITH:
1200 wt ppm SEEDS
CRYSTAL LENGTH: 0-6 μm
(x2500*)

PROCESS FOR PREPARING UNIFORM MFI-TYPE ZEOLITE CRYSTALS

BACKGROUND OF THE INVENTION

1. Field of the Invention

The present invention relates to a process for preparing crystals of an MFI-type zeolite whose crystals size is uniform and controlled, and to catalysts, catalyst carriers and adsorbents comprising zeolites when produced by this process.

2. Description of Related Art

Zeolites, molecular sieves having a crystalline structure which is typically an alumino silicate, find many uses as catalysts or catalysts carriers or as adsorbents. The habit and size of crystals is an important factor in the applicability of a zeolite. Generally the intrinsic quality of a zeolite is better when the crystals are small and uniform, than when the crystals are large and less uniform. Small, uniform crystals have a relatively low mass transfer resistance, and short pathways for molecules to enter and leave the zeolite structure.

As with many types of zeolite, MFI zeolites may be produced in many different crystal sizes and shapes. Indeed, within one batch of crystals there can be a significant variation in crystal habit and size. It is therefore desirable to be able to control reliably the size and size distribution of the crystals.

The present applicants have found that the use of a surprisingly small amount of seed crystals of size less than 100 nm average diameter may be used to produce accurately and reproducibly MFI-type crystals of uniform size.

Whilst the use of seed crystals when crystallising zeolites is a well known technique, previous publications recommended the use of a relatively large amount of seed. For example, EP-A-172068 describes a process in which a "complementary salt" or finely crushed crystals of a zeolite are added to the zeolite synthesis mixture. The examples suggest a weight percent of seed crystals of at least 0.8 weight percent based on the total weight of the synthesis mixture. EP-A-170486 suggests seeding a synthesis mixture with crystals of ZSM-50 or zeolite b. The examples use at least 0.66 weight percent of seed based on the total weight of the synthesis mixture. EP-A-110650 also suggests using seed crystals in zeolite synthesis. However, the examples all suggest an amount of seed of at least 0.6 weight percent based on the total weight of synthesis mixture.

GB 1567948 suggests the use of seeds in the synthesis of ZSM-5 zeolite. The amount of seed zeolite may be from 0.01 to 100 grams per 100 grams of $SiO_2$. However, the alkalinity of this synthesis mixture is 0.1 to 0.4 expressed as a molar ratio of $OH^-/SiO_2$ and the effect of the seeds on the crystal size and uniformity is obscured in a synthesis mixture with such a high alkalinity.

SUMMARY OF THE INVENTION

The present applicants have found that if the seed crystals are sufficiently small, possibly present in the synthesis mixture in the form of a colloidal suspension, and if the synthesis mixture has a sufficiently low alkalinity then as little as 1700 ppm or less (0.17 wt % or less) of seed crystals may be used, based on the weight of the synthesis mixture.

The present invention thus provides a process for the preparation of an MFI-type zeolite comprising mixing:

(i) a source of particulate silica in which silica particles present have an average diameter of 1 μm or less;

(ii) seeds of an MFI zeolite having an average diameter of 100 nm or less in the form of a colloidal suspension;

(iii) an organic structure directing agent; and (iv) a source of fluorine or an alkali metal;

to form an aqueous synthesis mixture, the seeds being present in an amount of 0.05 to 1700 ppm by weight of the synthesis mixture, and the synthesis mixture having an alkalinity, expressed as a molar ratio of $OH^-/SiO_2$, of less than 0.1; and allowing the synthesis mixture to crystallise.

BRIEF DESCRIPTION OF THE DRAWINGS

FIG. 2 is a graph showing the effect of the quantity of seed crystals used in the synthesis mixture of some of Examples 2–9 and the crystalline diameter of the resultant ZSM-5 crystals produced.

DETAILED DESCRIPTION OF THE INVENTION

Figure 1A:
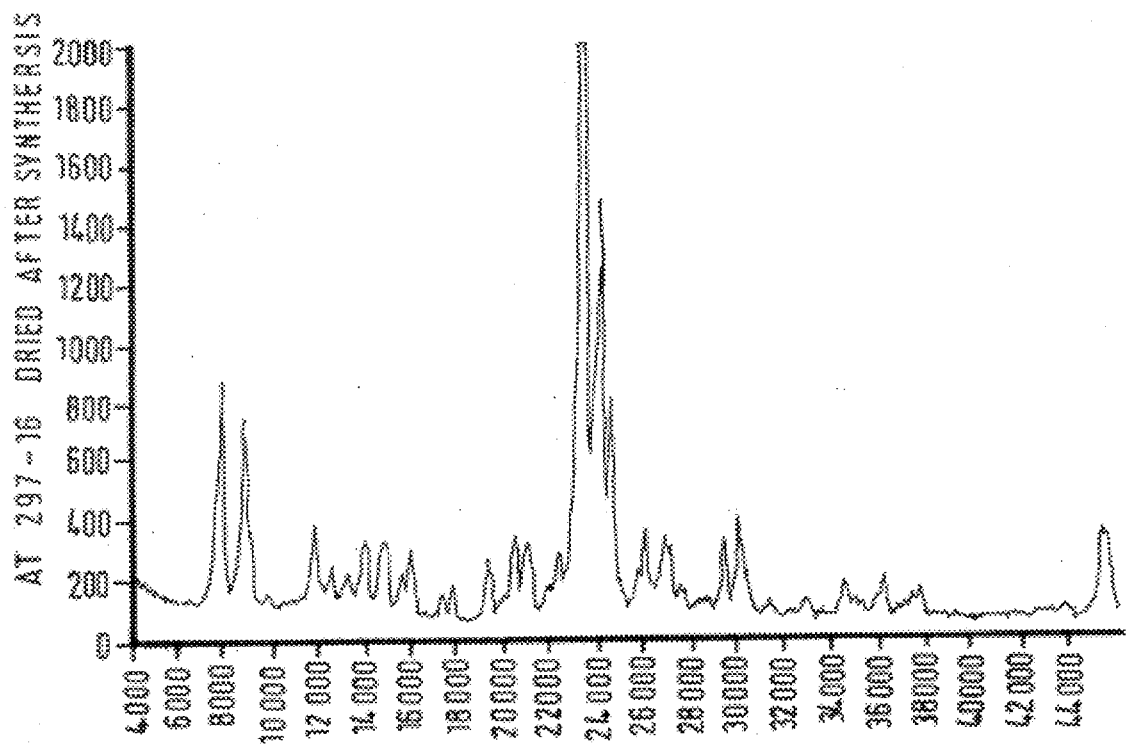
FIG. 1A shows a X-ray diffractogram of the colloidal seeds used in accordance with this invention.

Zeolites of MFI-type include e.g. ZSM-5, and silicalite and boro-, ferro-, zinco-, gallo- or vanado-MFI structures. For example, ZSM-5 also contains aluminum or a replacement for aluminium in the structure, such as gallium or an oxide of boron or a transition metal, e.g. iron, zinc or vanadium. The synthesis mixture may therefore contain a source of alumina or alumina substitute.

ZSM-5 and silicalite should be prepared in the presence of an organic structure directing agent. A structure directing agent is a molecule which directs the formation of a given molecular sieve by the so-called "templating effect". The role of organic molecules in molecular sieve synthesis is discussed in articles published in the literature, e.g. Lok et al, Zeolites 1983, Volume 3, pages 282 to 291 and Moretti et al, Chim. Ind. (Milan) 67, No. 1–2, 21 to 34 (1985). The effect of an organic structure directing agent is that in the production of the crystalline framework the organic compound behaves like a template around which the crystalline framework grows, or which causes the crystallisation to be directed to form a particular crystalline framework. Examples of structure directing agents which may be used in the present process include tetraethyl ammonium (TEA), tetrapropyl ammonium (TPA) or tetrabutyl ammonium (TBA) compounds. The lower the amount of aluminium in the synthesis mixture the more critical the choice of structure directing agent. TPA compounds are generally found to be the most appropriate.

A source of alkali metal or fluorine should also be present in the synthesis mixture. The alkali metal may be e.g.

sodium, potassium or caesium. Sodium is preferred. The amount and type of alkali metal or amount of fluorine present in the synthesis mixture will be determined by the particular zeolite it is desired to produce. Suitable quantities will be known to the skilled person provided that the $OH^-/SiO_2$ ratio is maintained at less than 0.1. If an alkali metal is added to the mixture in the form of its hydroxide, as is common, then account should be taken of the contribution this makes to the overall $OH^-/SiO_2$ ratio of the mixture as discussed below.

The silica source in the synthesis mixture is present in the form of very small particles i.e. average diameter 1 μm or less, preferably less than 500 nm, more preferably less than 50 nm so that the silica is evenly distributed throughout the synthesis mixture and remains evenly distributed during the crystallisation process. This may be achieved by using a colloidal silica source. Suitable commercially available colloidal silicas include e.g. Ludox. Suitable solid silica sources include e.g. Aerosil (Degussa) in which the silica particles may typically have an average diameter of 7 nm. If the silica is present in the form of e.g. solid particles whose average diameter is much greater than 1 μm, e.g. 50 μm, the particles settle at the bottom of the synthesis mixture during crystallisation, and the resulting crystals are less uniform in size. The crystals formed at the interface of the silica and the rest of the (seed-containing) synthesis mixture are relatively small, whereas the crystals formed by silica which has not "seen" the seed crystals will be much larger.

The seed crystals used are seeds of an MFI-zeolite which have an average diameter of 100 nm or less. These may be obtained by e.g. crushing in a ball mill crystals which have a larger size to give small crystals which, to obtain most benefit from being used as seed crystals, should be of uniform size. Seed crystals can be synthesised with an average diameter of 100 nm or less using the process described in our co-pending application of even date (N.63077).

The seed crystals are present in the synthesis mixture in the form of a colloidal suspension. Again this is to ensure that the seed crystals are evenly distributed throughout the synthesis mixture and remain so throughout the crystallisation time, to encourage the formation of uniform crystals. It was observed that if the pH of the colloidal suspension is below 8 there is a tendency for the solution to decolloidalise. The particles tend to form agglomerates.

The seed crystals may be present in an amount of 0.05 to 1700 ppm by weight of the synthesis mixture. The greater the amount of crystals, the smaller will be the crystals produced. However, this effect is asymptotic; use of an amount of much greater than 1700 ppm of seed crystals does not result in a correspondingly great reduction in crystals size and the amount of seed present in the synthesis mixture begins to be significant when calculating the overall composition of the zeolite to be produced. Therefore 1700 ppm is regarded as the maximum amount of seed crystals required in practice to produce small, uniform zeolite crystals.

By simply adjusting the quantity of seed crystals the crystal size of the zeolite produced can be reproducibly varied from about 30 microns to 0.3 microns, whilst maintaining a very high degree of uniformity of the crystals. The crystals produced by the process are generally uniform in size. The variance in diameter of spherical crystals, or in length of rhomboid or similar shaped crystals e.g. coffin-shaped crystals, is typically less than 10% and can be less than 8% of the average diameter or length.

The smaller the size of the seed crystals the lower the weight percentage of seeds required to achieve the same effect in the synthesis. The size of zeolite crystals synthesised could therefore also be controlled by altering the size of the seed crystals. However, it is generally more convenient to alter the amount of seed present since this technique has been found sufficiently sensitive to be of practical use, i.e. significant changes in crystal size can be produced by only a small change in the amount of seed used.

One of the advantages of the present invention is that the amount of seed crystals used in the synthesis mixture on a weight basis is extremely low, of the order of parts per million. The composition of the seed crystals is therefore not significant when calculating the composition of the zeolite based on the ingredients of the original synthesis mixture, and the seed crystals need not be of the same composition as the desired zeolite crystals.

The synthesis mixture in the process has an alkalinity, expressed in terms of a molar ratio of $OH^-/SiO_2$, of less than 0.1. When calculating this ratio, account should be taken of all sources of $OH^-$ ion in the synthesis mixture e.g. introduced as part of an alkali metal source. The effect of any acidity ($H^+$ ions) must be subtracted from the total amount of $OH^-$ before calculating the $OH^-/SiO_2$ molar ratio. Such $H^+$ ions may be introduced into the synthesis mixture e.g. in the form of aluminium sulphate.

Increasing the alkalinity to greater than 0.1 results, generally, in more nucleation in the synthesis mixture. Although this might be expected to lead to smaller crystals, the crystals are not uniform in size. To obtain small, uniform crystals it is necessary to maintain the alkalinity below 0.1 and use seed crystals.

In performing the process the source of silica particles, colloidal suspension of seeds, template source and alkali metal or fluorine source and, if present, any other ingredients may be added in any order, either sequentially or simultaneously. Preferably the synthesis mixture is stirred either whilst adding the ingredients, or after the ingredients have been added.

The mixture may be crystallised at an appropriate temperature, generally 140° to 200° C., e.g. 150° to 185° C. and for an appropriate time, generally 65 to 150 hours, e.g. 73 to 120 hours although suitable temperatures and times are easily determined by an ordinarily skilled person. The mixture may optionally be stirred during crystallisation.

After crystallisation the crystals may be washed and dried, and optionally, calcined.

The following examples illustrate the invention:

EXAMPLES

Preparation of Colloidal Seed Suspension

Where appropriate the Manufacturer's/Supplier's name and the product number are given in brackets after the name of each reagent.

| Component | Ingredients | Quantity in Grams |
| --- | --- | --- |
| A | Silicic acid powder (Baker 0324-5), 10% water, 99.9% purity | 113.73 |
| B | TPA OH (20% in water) (Fluka 88110), | 521.07 |
| C | NAOH (98.4%) (Baker 0402), | 7.37 |

Component C was dissolved in B at room temperature with stirring in a one liter glass beaker. Component A was weighed into the beaker and the contents of the beaker were heated to boiling while vigorously stirring. After a few minutes into boiling a clear solution was obtained. The weight loss due to the boiling was corrected with demineralized water. The molar composition of the synthesis mixture was:

0.53 Na$_2$O/1.51 (TPA)$_2$O/10 SiO$_2$/142 H$_2$O 639.40 grams of this solution was poured into a 1 liter polypropylene flask, the flask was placed in a 88° C. oilbath and connected to a reflux condenser. After some 16 hours into heating the initially clear solution became slightly opaque indicating the formation of extremely small crystals. After 3 days into heating the synthesis magma was cooled to room temperature. The crystals were separated from the mother liquor by centrifuging for several hours at 3750 rpm. The crystals were washed several times with demineralized water by redispersing the crystals in water and centrifuging the slurry until clear.

The crystals were washed to pH 10.3. The crystals were redispersed in the last washwater. This colloidal suspension was used as seed slurry.

Figure 1B:
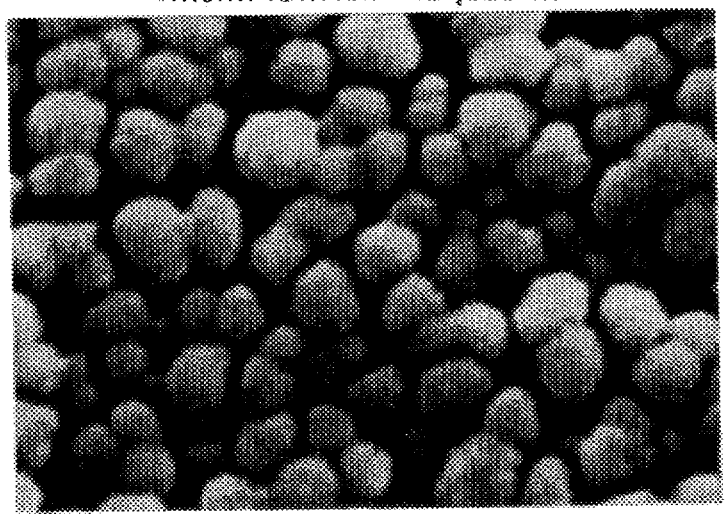
FIG. 1B shows a SEM micrograph of the colloidal seeds used in accordance with this invention.

A 10.00 gram sample of this colloidal seed suspension was evaporated to dryness in a porcelain dish for 6 hours at 105° C. followed by 2 hours at 175° C. The solids content of the suspension was 12.50 weight percent. Scanning electron micrograph (SEM) and X-ray diffraction (XRD) measurements on the dried powder showed that the product consisted of silicalite crystals of about 0.1 micron diameter. A 104000*SEM micrograph and X-Ray diffractogram are given in FIGS. 1B and 1A respectively.

COMPARATIVE EXAMPLE

MFI crystals were prepared in the absence of seed crystals. This example serves as a reference to show the effect using of seed crystals.

Preparation of Synthesis Mixture:

| Component | Ingredients | Quantity in Grams |
| --- | --- | --- |
| A (aluminate) | NAOH (98.4%) (Baker 0402) | 1.353 |
| | Al(OH)$_3$ (99.3%) (Baker 0005) | 0.205 |
| | H$_2$O | 10.03 |
| | Rinse H$_2$O | 10.08 |
| B (silicate) | Ludox HS-40 | 66.73 |
| C (TPA$^+$) | TPABr (Fluka 88105) | 10.68 |
| | H$_2$O | 40.11 |
| | Rinse H$_2$O | 16.18 |

The ingredients forming solution A were weighed in a 50 ml glass beaker. The ingredients were dissolved in the water by boiling until clear. The solution was cooled to room temperature and the weight loss due to the boiling was corrected with water. The ingredients forming solution C were weighed in a 100 ml glass beaker. Solution B was weighed in the glass mixing beaker belonging to a household mixer. Solution C was added to the contents of the mixing beaker. The rinse water was used to quantitatively transfer solution C. Solutions B and C were mixed together for 2 minutes. Finally, solution A was added, together with the rinse water. The whole was mixed for 5 minutes. A just pourable and smooth synthesis mixture was obtained. The molar composition of the synthesis mixture was:

0.375 Na$_2$O/0.90 TPABr/0.0294 Al$_2$O$_3$/10 SiO$_2$/146 H$_2$O

The alkalinity of the synthesis mixture, expressed as the OH$^-$/SiO$_2$ molar ratio was: 0.075.

CRYSTALLISATION: 103.43 grams of the synthesis mixture was transferred to a 150 ml stainless steel autoclave. The autoclave was placed without stirring in a room temperature oven. The oven was heated up linearly within 2 hours to 150° C. and kept at this temperature for 97 hours.

WASHING AND RECOVERY OF THE PRODUCT: The autoclave was cooled to room temperature and its content was collected in a one liter polypropylene centrifuge beaker. The product was separated from the mother liquor by centrifuging. The product was washed several times with water by reslurrying the product in water and subsequent separation by centrifuging. The pH of the last wash water was 9.2. The product was air-dried overnight at 98° C. The weight of the product recovered was 20.0 grams.

CHARACTERISATION: XRD and SEM showed that the product was excellently crystalline ZSM-5 consisting of spheroidal crystallites with a size of about 14 microns.

The following examples illustrate the effect on the crystallite size when the synthesis mixture is seeded with very small amounts of seed crystal.

Example 1

Synthesis mixture seeded with about 3 wtppm seed crystals.

The 12.50 weight percent seed suspension was diluted with water to 0.127 weight percent.

Preparation of Synthesis Mixture

| Component | Ingredients | Quantity in Grams |
| --- | --- | --- |
| A (aluminate) | NaOH (98.4%) (Baker 0402) | 1.355 |
| | Al(OH)$_3$ (99.3%) (Baker 0005) | 0.20 |
| | H$_2$O | 10.16 |
| | Rinse H$_2$O | 15.35 |
| B (silicate) | Ludox HS-40 | 66.73 |
| C (TPA$^+$) | TPABR (Fluka 88105) | 10.67 |
| | H$_2$O | 35.00 |
| | Rinse H$_2$O | 15.05 |
| D (seed slurry) | seed slurry 0.127 wt % solids in H$_2$O | 0.3313 |

Solution C was added to solution B, the two solutions were mixed for 2 minutes and the seed slurry D was added via a polypropylene pipette. The mixture B/C/D was mixed for 5 minutes. Finally solution A was added and the whole was again mixed for 5 minutes. The molar composition of the synthesis mixture was:

0.376 Na$_2$O/0.90 TPABr/0.0294 Al$_2$O$_3$/10 SiO$_2$/145 H$_2$O

Concentration of seed crystals in the synthesis mixture in mg/kg:

$$0.3313 \times 0.127 \times 10 \times \frac{10^3}{154.85} = 2.7$$

CRYSTALLISATION: 102.97 grams of the synthesis mixture was transferred to a 150 ml stainless steel autoclave. The autoclave was placed in a room temperature oven. The oven was heated-up linearly within 2 hours to 150° C. and was kept at this temperature for 97 hours. The synthesis mixture was not stirred during crystallisation.

The product was washed and recovered in the same way as described in the non-seeded comparative example. The weight of the product recovered was 19.7 grams. XRD and SEM showed that the product was excellently crystalline ZSM-5 consisting of spheroidal crystallites with a size of 4.2 microns. The crystallites were remarkably uniform in shape and size.

Examples 2 to 9

A series of eight synthesis mixtures were prepared which were seeded with respectively 10, 20, 30, 60, 200, 400, 800 and 1600 wtppm seed crystals. The molar composition of these synthesis mixtures was the same as in example 1, namely:

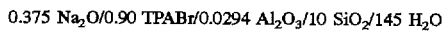

0.375 $Na_2O$/0.90 TPABr/0.0294 $Al_2O_3$/10 $SiO_2$/145 $H_2O$

To avoid unwanted seeding effects, the autoclaves used to crystallise the above eight synthesis mixtures were carefully cleaned. This was done by treating the autoclaves with a 5M KOH solution for 16 hours at 150° C. This treatment is believed to destroy zeolite crystals from a previous synthesis which may be adhering to the autoclave wall. The synthesis mixtures were crystallised under static conditions i.e. without stirring at 150° C. for 97 hours. The products were washed with water to pH about 9.2 and dried for 16 hours at 98° C.

XRD showed that all products were excellently crystalline ZSM-5. SEM measurements showed that per batch the crystallites were remarkably uniform in size and shape, e.g. within one batch there was virtually no crystallite size distribution. SEM also showed that by varying the amount of seed crystals in the synthesis mixture the crystallite size can be very carefully controlled. The effect of the quantity of seed crystals on the crystallite diameter is given in FIG. 2.

Figure 3A:
FIGS. 3A, 3B and 3C show SEM micrographs of unseeded crystals and the seeded crystals produced in some of Examples 2–9.
Figure 3B:
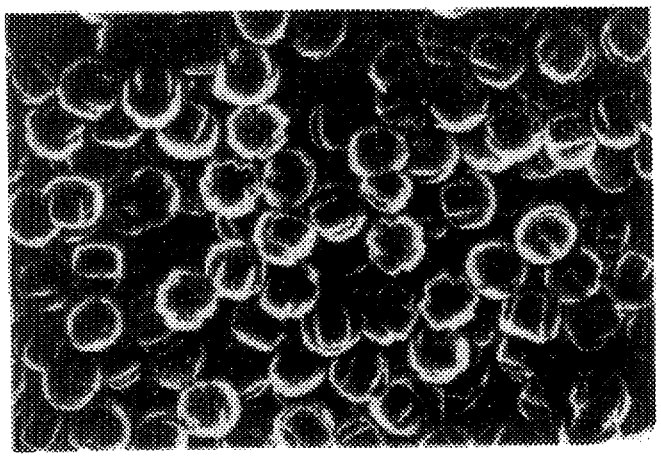
Figure 3C:
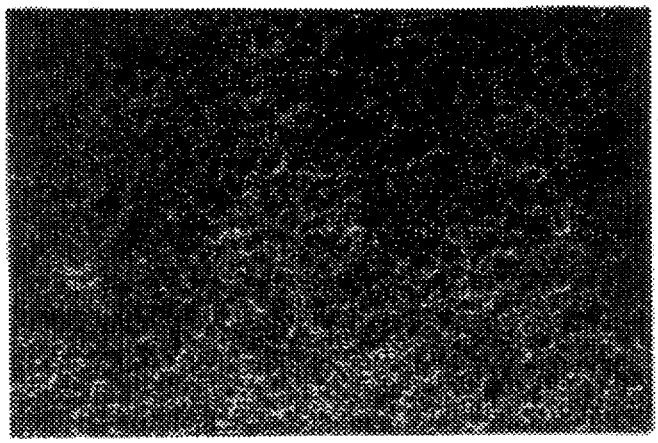

In FIGS. 3A–3C SEM micrographs are shown of ZSM-5 crystals synthesized respectively without seeds, and with 2.7 ppm and 1600 ppm seeds.

Examples 10 to 16

Effect of seeds on the crystallite size of coffin-type silicalite.

A series of synthesis mixtures were prepared which upon crystallisation will give a so-called coffin-type morphology. These synthesis mixtures were seeded with various amounts of seed crystals. The source of the seed crystals was the colloidal seed suspension described earlier.

The molar composition of the synthesis mixtures was:

19.31 $NH_4OH$/1.40 TPABr/10 $SiO_2$/185 $H_2O$

The amount of seed crystals (based on the weight of the synthesis mixtures) in each example is given in Table 1 below:

TABLE 1

| Example | Amount of Seed Crystals (ppm) |
|---|---|
| 10 | 0 |
| 11 | 2.8 |
| 12 | 8.5 |
| 13 | 16.5 |
| 14 | 30 |
| 15 | 120 |
| 16 | 1200 |

Figure 4:
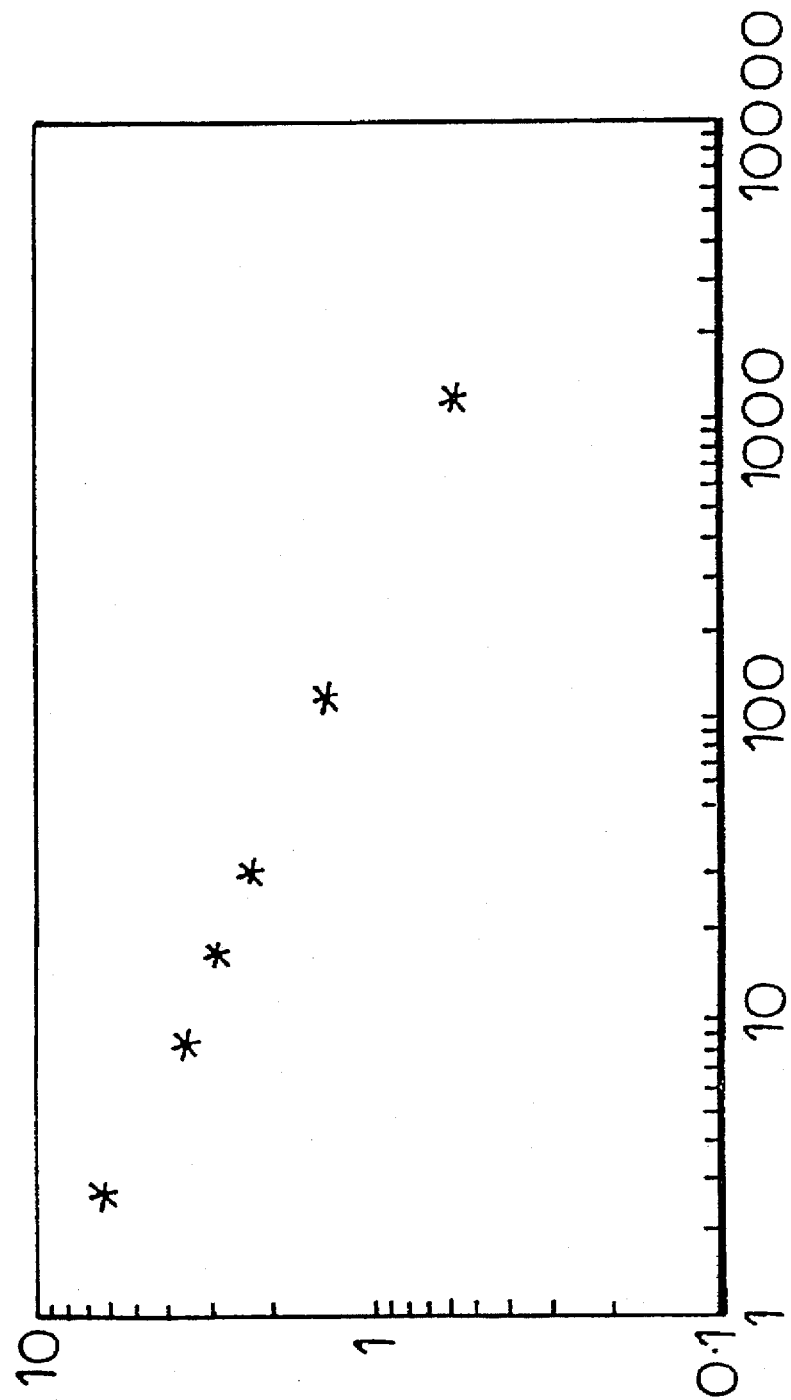
FIG. 4 is a graph showing the relationship between the log of amount of seed crystals in ppm and the log of average crystal length produced in accordance with some of Examples 10–16.

The synthesis mixtures were crystallised in 300 ml stainless steel autoclaves at 175° C. for 120 hours under static conditions. The products were recovered as described for Examples 1 to 9. The morphology and size of the crystals were examined by SEM. All products had the typical coffin-type morphology and were remarkably uniform in crystal shape and size. Depending on the amount of seeds the crystallite length varied from 30 microns (no seeds used) down to 0.5 microns (1200 wtppm seed). FIG. 4 shows the relationship between the log of amount of seed in ppm and the log of average crystal length produced. An entry for Example 10, in which log of seeds (ppm) is—infinity, has been omitted.

Figure 5A:
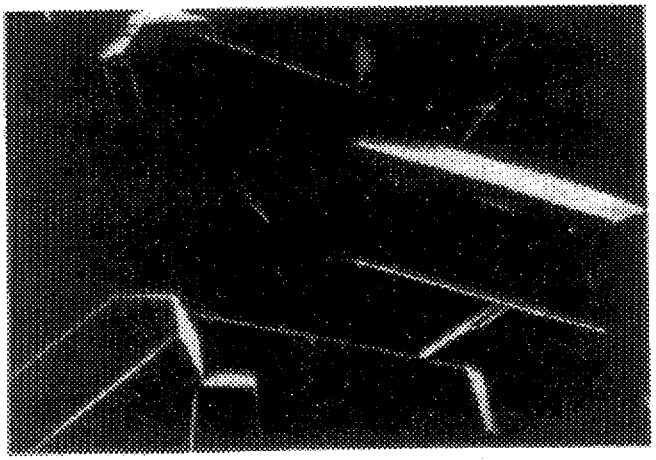
FIGS. 5A, 5B and 5C show SEM micrographs of unseeded crystals and the seeded crystals produced in Examples 10–16.
Figure 5B:
Figure 5C:
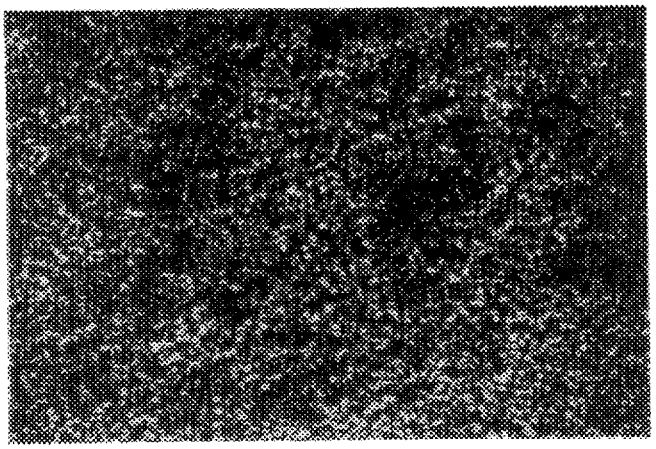

In FIGS. 5A–5C SEM micrographs are shown of the coffin-type crystals synthesised respectively without seeds, and with 8.5 ppm and 1200 ppm seeds.

Example 17

This example shows the benefit of using colloidal silica, rather than a source of silica particles whose average diameter greatly exceeds 1 μm.

Synthesis mixtures were prepared containing the following ingredients: (weight of reactants given in grams)

| Component | Ingredients | Quantity in Grams |
|---|---|---|
| | Colloidal Silica Mixture | |
| A | NaOH (98%) (Baker 0402) | 3.053 |
| | $H_2O$ | 22.56 |
| | Rinse $H_2O$ | 34.19 |
| B | Ludox HS-40 | 150.28 |
| C | TPABR (Fluka 88105) | 24.05 |
| | $H_2O$ | 80.06 |
| | Rinse $H_2O$ | 33.98 |
| D | Seed Slurry (3.12 wt % Solids) | 0.2743 |
| | Solid Silica Mixture | |
| A | NAOH (98.4%) | 3.055 |
| | $H_2O$ | 22.56 |
| | Rinse $H_2O$ | 34.03 |
| B | $SiO_2$ (Baker) | 66.78 |
| C | TPABR (Fluka) | 24.05 |
| | $H_2O$ | 81.89 |
| | Rinse $H_2O$ | 34.22 |
| D | $H_2O$ | 81.42 |
| E | Seed Slurry (3.12 wt % solids) | 0.5594 |

To prepare the synthesis mixture using colloidal silica, the solutions B, C and D were mixed for five minutes in a household mixer. Solution A was added and the whole was again mixed for a further five minutes.

To prepare the mixture using solid silica, B was mixed with C, D and E for five minutes in a household mixer. A was added and the whole was again mixed for five minutes.

The compositions of the synthesis mixtures (molar ratio) are as follows:

Colloidal Silica: 0.376 $Na_2O$/0.90 TPA/10 $SiO_2$/145 $H_2O$ plus 25 weight ppm seeds based on the total weight of synthesis mixture.

Solid Silica: 0.376 $Na_2O$/0.90 TPA/10 $SiO_2$/145 $H_2O$ plus 50 weight ppm seeds based on the total weight of synthesis mixture.

310.25 grams of the colloidal silica synthesis mixture was transferred to a 300 milliliter stainless steel autoclave. 338.35 grams of the solid silica synthesis mixture was transferred to another 300 milliliter stainless steel autoclave. The autoclaves were placed in a room temperature oven and heated within two hours to 150° C. under static conditions. This temperature was maintained for 96 hours.

The products were washed and recovered as follows:

Colloidal Synthesis Mixture: washed four times with approximately 600 milliliters water. The last wash water had a pH of 8.6.

Solid Silica Mixture: washed five times with 600 milliliters of water. The last wash water had a pH of 8.8.

Figure 6A:
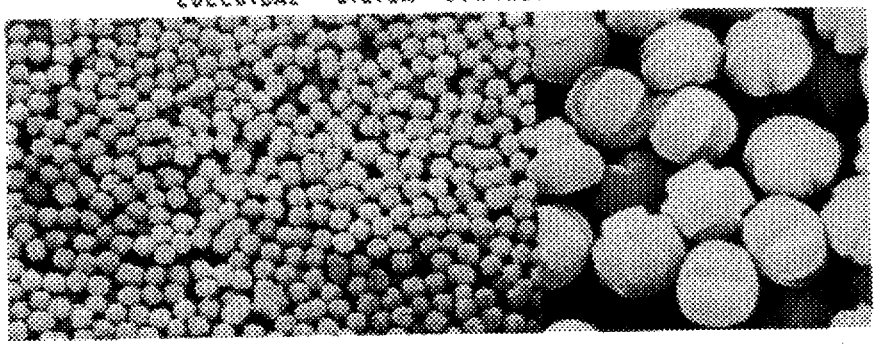
FIGS. 6A and 6B show SEM micrographs of crystals produced in Example 17.
Figure 6B:

The products were dried overnight at 120° C. 60.5 grams of product was obtained from the colloidal silica synthesis mixture. 59.7 grams of product was obtained from the solid silica synthesis mixture. FIGS. 6A and 6B show SEM micrographs of the crystals produced. FIG. 6A shows the crystals produced using colloidal silica in the synthesis mixture. (magnification 2500* on the left, 10000* on the right). FIG. 6B shows the crystals produced using solid silica (magnification 1250* on the left and 5000* on the right).

It can be seen that using solid silica results in a mixture of crystal sizes. Small crystals are produced where the silica has "seen" the seeds in the synthesis mixture. Large crystals are produced where the seeding effect has not taken place. Colloidal silica, resulting in an even distribution of silica throughout the synthesis mixture results in extremely uniform crystals.

Example 18

Production of fluoride silicalite at low alkalinity. This is based on Example 4 of U.S. Pat. No. 4,073,865 and demonstrates that the seeding technique is applicable to this process.

A comparison was made between crystals produced from a seeded and non-seeded synthesis mixture. The synthesis mixtures were prepared from the following ingredients (weight of reactants given in grams)

| Component | Ingredient | Quantity in Grams |
| --- | --- | --- |
| | Non-seeded Mixture | |
| A | TPABR (Fluka) | 7.17 |
| B | NH$_4$F (Ventron) | 4.98 |
| C | H$_2$O | 75.05 |
| | Rinse Water | 13.27 |
| D | Ludox AS-40 | 80.02 |
| | Seeded Mixture | |
| A | TPABR (Fluka) | 7.17 |
| B | NH$_4$F (Ventron) | 4.99 |
| C | H$_2$O | 75.03 |
| | Rinse Water | 11.40 |
| D | Ludox AS-40 | 80.01 |
| E | Colloidal Seed Mixture (12.5 wt % solids) | 2.39 |

The colloidal seed mixture was prepared in accordance with the process previously described.

When preparing the non-seeded mixture, A and B were added to C, and mixed until a clear solution was obtained. D was poured into a high shear mixer, and the solution of A/B/C was added, together with the rinse water which was used to rinse the beaker which contained A/B/C. The whole mixture was then mixed for five minutes.

Preparation of the seeded mixture was carried out in the same way as for the non-seeded mixture, but the seed solution, E, was added to the Ludox (D) and mixed for a few seconds before the other ingredients were added.

The pH of each synthesis mixture was 7.8.

The compositions of the synthesis mixtures (expressed in moles) were as follows:

Non-seeded mixture: 0.51 TPABr/2.53 NH$_4$F/10 SiO$_2$/142 H$_2$O.

Seeded mixture: 0.51 TPABr/2.53 NH$_4$F/10 SiO$_2$/142 H$_2$O plus 1650 weight ppm seeds based on the weight of the gel.

The alkalinity of each synthesis mixture was extremely low expressed as OH$^-$/SiO$_2$; this ratio was less than 0.01.

154.05 grams of the non-seeded mixture was placed in a stainless steel autoclave. 154.23 grams of the seed mixture was placed in a second stainless steel autoclave. The autoclaves were placed in a room temperature oven and heated within 30 minutes to 185° C. This temperature was maintained for 73 hours. The mixture was not stirred during this time.

Recovery of Product

The non-seeded mixture had a mother liquor with a pH of 8.5. This product was washed with five portions of approximately 600 milliliters of water. The last wash water had a pH of 7.2.

The seeded mixture had a mother liquor with a pH of 8.6. This product was washed with four portions of approximately 700 milliliters of water. The last wash water had a pH of 7.3.

The products were dried overnight at 95° C. The non-seeded mixture gave 28.4 grams of product (product yield 18.4 weight percent). The seeded mixture gave 32.0 grams of product (product yield 20.8 weight percent).

The product obtained from the seeded synthesis mixture was calcined in air to remove the organic additive. The material was heated up from room temperature to 500° C. at a rate of 2° C. per minute, and held at 500° C. for 12 hours. The weight loss on calcination was 12.5 weight percent, given a product yield after calcination of 18.2 percent. The higher product yield indicates that this type of synthesis is very effective, the mother liquor should be completely depleted of silica. The weight of SiO$_2$ in the seeded gel was 27.3 grams. The weight of seed crystals in the gel was 0.255 grams. Assuming that the seed crystals contain approximately 12.5 weight percent of organic additives, the weight of calcined seed is 0.255−(0.125×0.255)=0.233 grams.

The theoretical weight of solids which can be obtained from this synthesis mixture is therefore 27.3+0.2=27.5 grams. The actual calcined product obtained was 28.0 grams. This demonstrates the effectiveness of the seeded process.

Figure 7A:
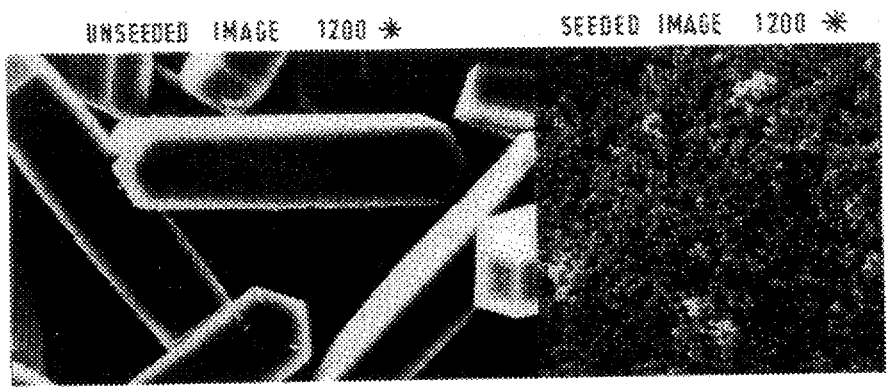
FIGS. 7A and 7B show SEM micrographs of crystals produced in Example 18.
Figure 7B:
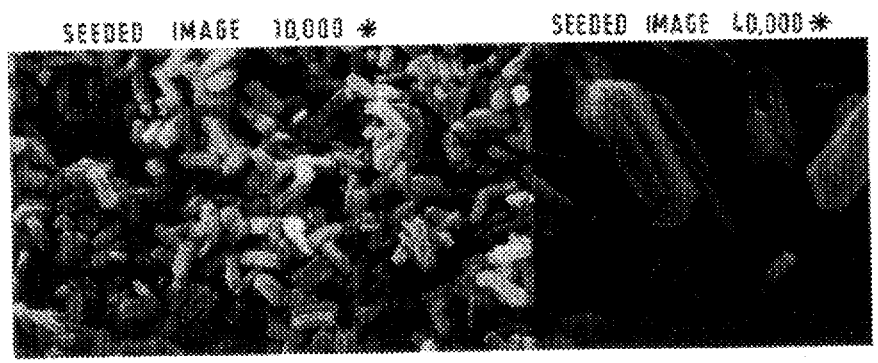

FIGS. 7A and 7B show the SEM micrographs of zeolite crystals prepared by this example. The left hand micrograph of FIG. 7A shows the crystals produced from the unseeded synthesis mixture (magnification 1250*). The right hand micrograph of FIG. 7A shows at the same magnification the much smaller crystals produced using the seeded mixture. Small, amorphous portions remaining in the unseeded mixture can be seen in the micrograph as specks or dots on or attached to the coffin-shaped crystals.

FIG. 7B shows the crystals produced from the seeded mixture at higher magnification (10,000 times on the left; 40,000 times on the right). It can be seen from this that the seed mixture has produced well formed, uniform crystals.

The average crystallite length produced from the unseeded mixture is about 60 to 70 microns. In the seeded mixture, the crystals produced have a length of approximately 1 micron.

I claim:

1. A process for the preparation of an MFI-type zeolite comprising mixing:
   (i) a source of particulate silica in which silica particles present have an average diameter of 1 µm or less;
   (ii) seeds of an MFI zeolite having an average diameter of 100 nm or less in the form of a colloidal suspension;

(iii) an organic structure directing agent; and (iv) a source of fluorine or an alkali metal;

to form an aqueous synthesis mixture, the seeds being present in an amount of 0.05 to 1700 ppm by weight of the synthesis mixture, and the synthesis mixture having an alkalinity, expressed as a molar ratio of $OH^-/SiO_2$, of less than 0.1, and allowing the synthesis mixture to crystallise.

2. A process according to claim 1 in which the seed suspension has a pH of 8 or more.

3. A process according to claim 1 in which the synthesis mixture is crystallised at 140° to 200° C.

4. A process according to claim 1 in which the crystallisation time is 65 to 150 hours.

5. A process according to claim 1 in which the crystals produced have an average diameter or length of 0.3 to 30 micrometers.

6. The process according to claim 5 in which the crystals produced have a variance in diameter of spherical crystals or in the length of rhomboid crystals of less than 10% of the average diameter or length of said crystals.

7. A process according to claim 1 in which the synthesis mixture also comprises a source of aluminum, gallium, boron, iron, zinc or vanadium.

8. A process according to claim 1 in which the organic structure directing agent is a tetraethyl ammonium, tetrapropyl ammonium or tetrabutyl ammonium compound.

9. A process according to claim 8 in which the organic structure directing agent is a tetrapropyl ammonium compound.

10. A process according to claim 1 in which the zeolite produced is calcined.

11. The MFI-type zeolite prepared by the process of claim 1, said zeolite characterized by a uniform crystal particle size in the range of 0.3 to 30 microns and a variance in diameter of spherical crystals or in the length of rhomboid crystals being less than 10% of the average diameter or length of said crystals.

12. The zeolite of claim 11 wherein said variance is less than 8% of the average diameter or length of said crystals.

13. The zeolite of claim 11 wherein said crystals are spherical.

* * * * *